(12) United States Patent
Molnar

(10) Patent No.: US 8,064,531 B2
(45) Date of Patent: Nov. 22, 2011

(54) METHOD AND APPARATUS FOR INTERFERER PARAMETER ESTIMATION USING MULTIPLE RECEIVER ARBITRATION

(75) Inventor: Karl Molnar, Cary, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 280 days.

(21) Appl. No.: 12/612,208

(22) Filed: Nov. 4, 2009

(65) Prior Publication Data

US 2011/0103520 A1    May 5, 2011

(51) Int. Cl.
   *H04K 1/10* (2006.01)
   *H04L 27/28* (2006.01)
(52) U.S. Cl. ........ 375/260; 375/324; 375/340; 370/203; 370/208; 329/311
(58) Field of Classification Search .................. 375/260, 375/267, 324, 340, 347; 370/203–211; 329/311–314
   See application file for complete search history.

(56) References Cited

U.S. PATENT DOCUMENTS

| | | | |
|---|---|---|---|
| 7,328,389 B2 * | 2/2008 | Murakami et al. | 714/746 |
| 7,613,104 B2 * | 11/2009 | Bhatt et al. | 370/208 |
| 2008/0123516 A1 * | 5/2008 | Anderson et al. | 370/208 |

OTHER PUBLICATIONS

Barreto et al.: "A critical analysis of receiver diversity with multiple antennas with spatially coloured noise", Signal Processing Advances in Wireless Communications, 2008. SPAWC 2008. IEEE 9thWorkshop ON, IEEE, Piscataway, NJ, USA, Jul. 6, 2008.

* cited by examiner

*Primary Examiner* — Curtis Odom

(57) ABSTRACT

In one embodiment, a receiver implements a method of demodulating a set of symbols dispersed within a time-frequency grid of a received OFDM signal. The method includes determining which one of two or more demodulators is preferred for use in a given region of the time-frequency grid by evaluating detection statistics generated by the demodulators for the set of symbols. Each demodulator operates according to different demodulation parameters that correspond to different interference assumptions. The method further includes recovering the set of symbols for decoding using whichever demodulator is preferred for each symbol according to the region from which the symbol is recovered. The method may be further extended by updating each demodulator's demodulation parameters using reference and/or data symbols from the region(s) where that demodulator is preferred, and recovering the desired symbols using the updated demodulation parameters. Such updating can be further iterated, for additional demodulation parameter refinement.

23 Claims, 7 Drawing Sheets

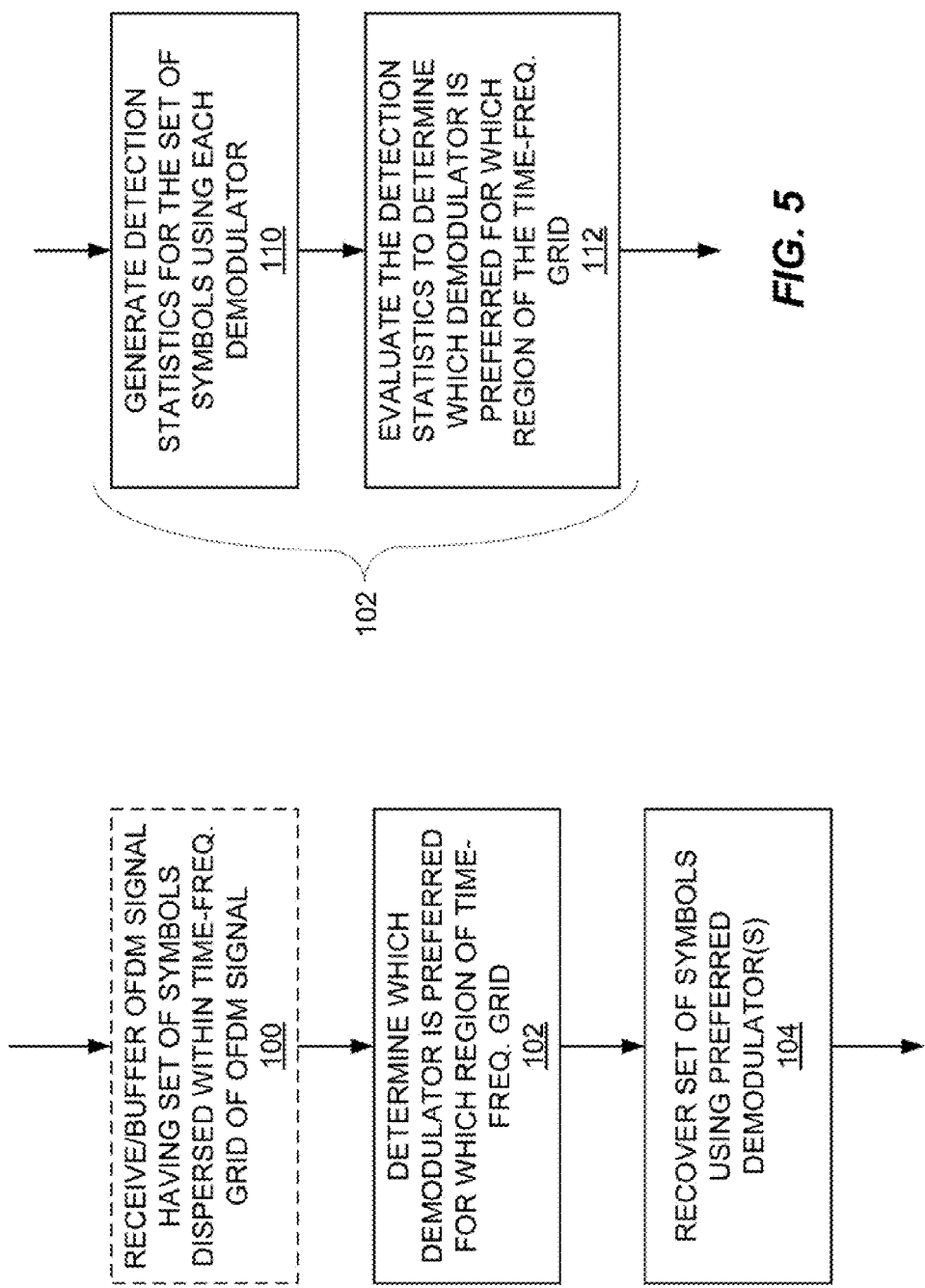

METHOD AND APPARATUS FOR INTERFERER PARAMETER ESTIMATION USING MULTIPLE RECEIVER ARBITRATION

FIELD OF THE INVENTION

The present invention generally relates to wireless communications, and particularly relates to interferer parameter estimation for mitigation of interference in a wireless communication receiver.

BACKGROUND

Conventional cellular area systems are typically deployed with mobile terminals that have the capability to mitigate interference. Mitigating interference has the effect of improving the signal to interference plus noise ratio (SINR) measured at the output of the receiver, resulting in better performance. This capability can be used, for example, in detecting transmitted data information or in computing some measure of channel quality information (CQI) that is used for link adaptation and user scheduling.

Interference mitigation can be accomplished by different methods. One approach is to cancel the interference from the received signal. Another is to jointly detect both a desired and an interfering signal, which improves the detection of the desired signal. In both cases, some parameters must be estimated with respect to the interfering signal.

Interference cancellation techniques commonly compute an impairment covariance that is used to cancel interference in interference rejection combining (IRC), generalized Rake (GRAKE), or successive interference cancellation (SIC) receivers. Estimation of an impairment covariance comprises, for example, removing the contribution of the desired signal from the received signal and forming the impairment covariance. Examples of this approach include known reference pilots available for channel estimation, or a detected data stream. When the interference is stationary over many samples in time and/or in frequency, averaging (e.g. filtering, smoothing, etc.) can be used to improve the impairment covariance estimation by lessening the effects of random noise.

If joint detection is used to mitigate interference, parameters used for detecting the desired and interferer signals must be obtained. For example, with coherent demodulation, an estimate of the interferer's channel response might be required along with the desired signal's channel response. These could be obtained if the pilot signals are known for both the desired and interfering signal. Alternatively, if only the desired signal's pilots are known, the interferer channel could be estimated using blind techniques. See U.S. Pat. No. 6,832,080, for example.

Co-channel interference itself can arise from different sources. For example, in systems using multi-stream transmission, such as multiple-input, multiple-output (MIMO) approaches, the different streams interfere with each other. However, both streams are considered part of the desired signal transmission to be sorted out at the receiver. Additionally, there is co-channel, inter-cell interference from other cells, which is undesired.

As today's systems transition to packet networks, data transmission may be discontinuous in time. A user's transmission time and duration depends on the amount of data required to be sent as well as the scheduling of the users by the system. The implication of this is the interference environment presented to the base or mobile is also discontinuous. Further, with Orthogonal Frequency Division Multiplex (OFDM) systems that allow the scheduling of users to take place in both the time and frequency domains, interferer discontinuities may exist in either domain.

The issue of discontinuous interference affects both link adaptation and data detection, and the effect is two-fold. First, when the interference is temporally discontinuous, the estimate of the impairment covariance may not be accurately obtained (e.g. the averaging time required to compute an accurate impairment estimate may be longer than the time the interference is stationary). Temporal discontinuities degrade both the detection quality and the estimation of the SINR used in link adaptation. Second, even in the case where the interferer parameters can be accurately estimated at a certain time, the interference can change between when they are estimated and when the data for the scheduled user is transmitted. Changes in the type or nature of interference results in a mismatch in the selected modulation and coding schemes (MCSs) and leads to detection errors or lower user throughputs.

In an OFDM system, such as LTE, the interference (and thus the SINR) is expected to be localized over the time/frequency dimensions due to the temporal fading and frequency dispersion as well as from the scheduling of users. For example, two users may be scheduled in one LTE sub-frame, such that one user's signal dominates the interference for a portion of the sub-frame, while the other user's signal dominates the interference for another portion of the sub-frame. In addition, there may be overlapping areas and areas where neither user presents interference. Thus, computing parameters for each interferer region should only use the received signal corresponding to that region.

Another example of interferer discontinuities is when an interferer signal is transmitted with different rank assignments, for example, due to the use of different pre-coding schemes. The rank of the interferer signal might be different in different parts of the signal bandwidth, causing interferer discontinuities in frequency.

In some parts of the time-frequency grid, a receiver that does not cancel interference may be preferred. However, in other parts of the grid, a receiver that cancels interference may be preferred. In theory, such operation can be accomplished, for example, by having one receiver that operates under different parameter settings—one for a noise only impairment and another for an impairment that includes interference. In practice, however, the difficulty lies in choosing when and where to use which receiver.

An alternative is an approach that selects between single-user demodulation or two-user (joint) demodulation and is described for a narrow-band TDMA system in U.S. Pat. Nos. 7,016,436 and 6,832,080. In these approaches, a determination is made using the transmitted pilot symbols as to which of the two receivers should be used for data detection. Under certain conditions (e.g. when the desired signal to noise ratio is low or there is no interference) single user demodulation is selected. When conditions are favorable, joint detection is used as a means for canceling the interferer transmission. However, the decision about which demodulation technique to use is made using the desired signal's training sequence and prior to data demodulation.

Another alternative is described in U.S. Pat. No. 7,440,489 B2 for a spread-spectrum system (e.g. WCDMA). In this approach, a first demodulation is performed on a de-spread signal. A second demodulation is performed either in parallel or in succession and one of the demodulated signals is selected depending on quality measures for the first and second demodulation. One of the detected signals is selected for further decoding.

Such approaches perform demodulation on all of the signal's samples using one of the available demodulators. This can be performed since there is a training or pilot sequence in time that allows for the impairment parameters to be estimated prior to demodulation. For an OFDM system such as LTE, a two-dimensional grid of symbols is transmitted with pilots spaced sparsely throughput this grid. Since the interference is localized within this grid, reliable estimation of the interference parameters becomes more difficult. For example, pilot symbols are spaced six sub-carriers apart in frequency and three, four or seven OFDM symbols apart. Thus, detecting interferer discontinuities using only reference pilots alone is made more difficult by the sparseness of the pilots.

SUMMARY

In one embodiment, a receiver implements a method of demodulating a set of symbols dispersed within a time-frequency grid of a received OFDM signal. The method includes determining which one of two or more demodulators is preferred for use in a given region of the time-frequency grid by evaluating detection statistics generated by the demodulators for the set of symbols. Each demodulator operates according to different demodulation parameters that correspond to different interference assumptions. The method further includes recovering the set of symbols for decoding using whichever demodulator is preferred for each symbol according to the region from which the symbol is recovered. The method may be further extended by updating each demodulator's demodulation parameters using reference and/or data symbols from the region(s) where that demodulator is preferred, and recovering the desired symbols using the updated demodulation parameters. Such updating can be further iterated, for additional demodulation parameter refinement.

In a corresponding embodiment, a receiver is configured for demodulating a set of symbols dispersed within a time-frequency grid of a received Orthogonal Frequency Division Multiplexed (OFDM) signal. The receiver comprises two or more demodulators, each configured to demodulate symbols from the received OFDM signal, and each operating according to different demodulation parameters corresponding to different interference assumptions. The receiver further includes a control circuit operatively associated with the two or more demodulators. The control circuit is configured to determine which one of the two or more demodulators is preferred for use in a given region of the time-frequency grid by evaluating detection statistics generated by the two or more demodulators for the set of symbols, and to recover the set of symbols for decoding using whichever demodulator is preferred for each symbol according to the region from which the symbol is recovered.

Another embodiment provides a method implemented in a receiver. The method provides for demodulating a set of symbols dispersed within a time-frequency grid of a received OFDM signal. In this regard, the method includes performing at least one cycle of processing. Each cycle includes demodulating the set of symbols with each of two or more demodulators, wherein each demodulator is configured according to a different interference assumption, and further includes comparing demodulation performance of the two or more demodulators on a per symbol basis for at least some of the symbols in the set of symbols. In so doing, the method identifies which demodulator exhibits relatively better demodulation performance at grid locations in the time-frequency grid corresponding to at least some of the symbols.

Correspondingly, the method further includes updating each demodulator's demodulation parameters using reference (and/or data) signal measurements taken from the received OFDM signal at or proximate to those grid locations where the demodulator exhibited relatively better demodulation performance, and recovering the set of symbols for decoding by the receiver using, for each symbol in the set of symbols, whichever demodulator exhibited relatively better performance at or proximate to the grid location of that symbol. In this context, the two or more demodulators operate with their updated demodulation parameters for said step of recovering.

In its various embodiments, the present invention provides improved detection for users—e.g., mobile terminal users—operating in a discontinuous interference environment in an OFDM system. The detection process includes demodulating symbols of interest using multiple demodulators, each hypothesizing a different interference environment. Each demodulator uses a set of demodulator parameters embodying that demodulator's assumed interference environment. Such parameters may be initialized, for example, using known reference pilot symbols taken from the received signal. The output of each demodulator is then passed to a function that selects which demodulator's output is to be passed on as the detected symbol. The detected symbols are output as well as an indicator of the hypothesis selected for each detected symbol. This information is fed back and used to refine the demodulation parameter estimation, according to each demodulator's interference hypothesis, and such processing can be iterated until a performance metric is met, or some desired number of times.

Alternatively, in one or more embodiments, the detected symbol(s) selected for output can be decoded and re-encoded to help improve the re-estimation of the demodulation parameters. In an LTE system, such operations can be used with sub-block coding, so that data portions of the transmitted signal can be used for improved parameter estimation (instead of, or in addition to reference symbol portions of the signal).

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 4 is a logic flow diagram illustrating one embodiment of a method according to the teachings presented herein.

FIG. 5 is a logic flow diagram illustrating additional details for one or more of the processing steps depicted in FIG. 4.

DETAILED DESCRIPTION

Figure 1:
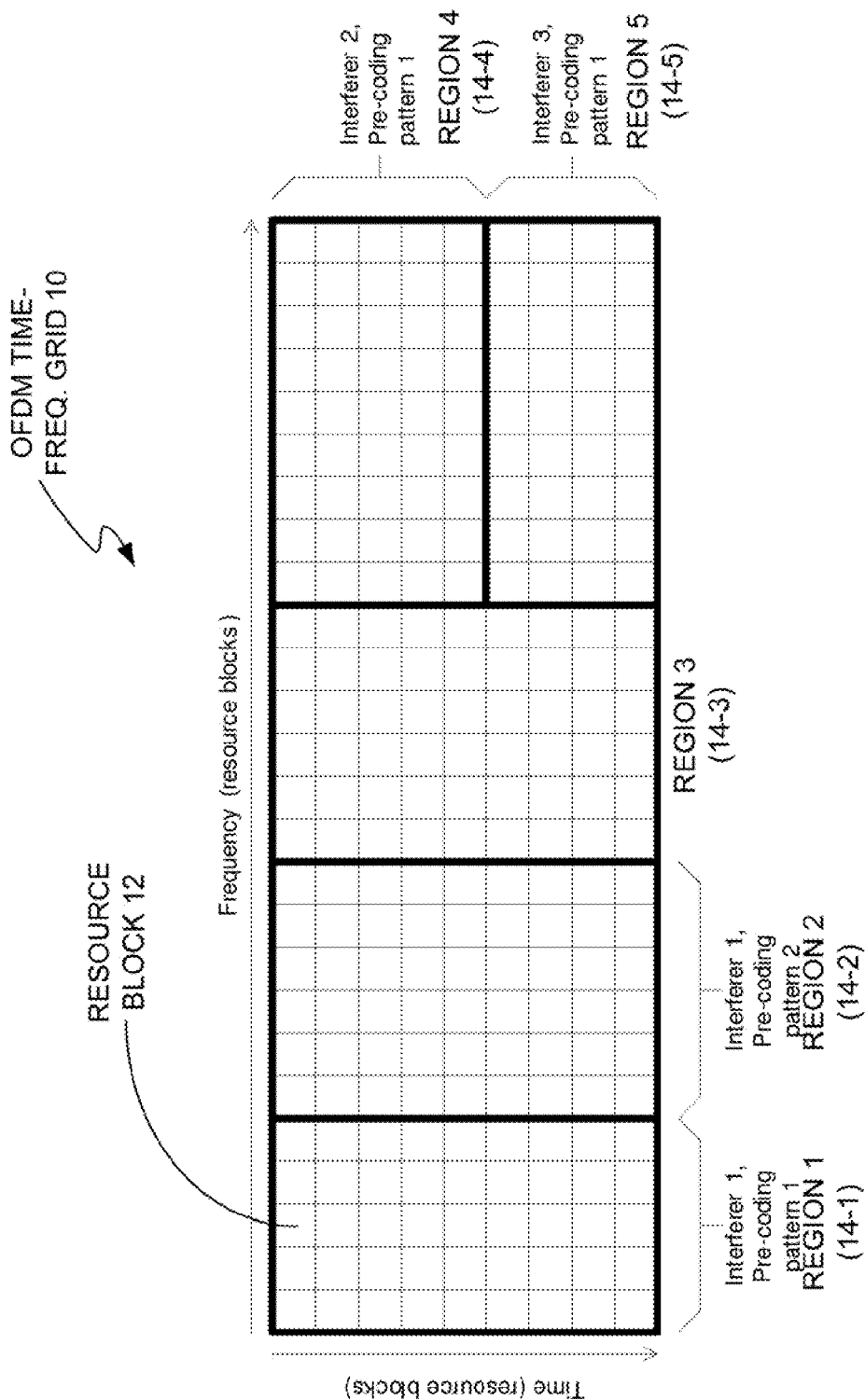
FIG. 1 is a diagram of an example OFDM time-frequency grid in relation to OFDM resource blocks, illustrating hypothesized interference patterns resulting in different regions of the grid having different interference environments.

FIG. 1 depicts an example time-frequency grid 10 of an Orthogonal Frequency Division Multiplexed (OFDM) signal, such as may be received at a wireless communication receiver while operating in an LTE or other OFDM-based communication network. One sees that the grid 10 comprises an array of "resource blocks" 12, with the horizontal dimension corresponding to the frequency domain, and the vertical dimension corresponding to the time domain. Further, one sees that different parts or regions of the OFDM time-frequency grid 10 are subject to different interferences.

For example, heavier, bold lines are used to identify various regions 14 in the OFDM time-frequency grid, where differing types or patterns of interference define the different regions, and where there are at least two signals: the signal from the desired transmitter and at least one signal from an interfering transmitter. Within individual regions there may exist either no interference, or interference arising from at least one signal from an interfering transmitter. In this example, the received co-channel interference is another pre-coded OFDM signal that originates from a different base station than the desired transmitted signal. Region 1 (denoted as 14-1) in the diagram is defined by a first pre-coding pattern, which itself is determined by the scheduling/pre-coding selections made by an interfering transmitter—e.g., a wireless communication network base station—that is originating the interfering OFDM signal represented by the grid. Further interference regions (denoted as 14-2, 14-4, and 14-5) are defined by different user scheduling and/or pre-coding selections made by the interfering transmitters. Interferer region 14-3 contains only noise, corresponding to no scheduled interferer in that region. In all, the hypothesized interference patterns include five regions (14-1 . . . 14-5), wherein the particular interference at play in each region 14 differs from the other regions 14.

Figure 2:
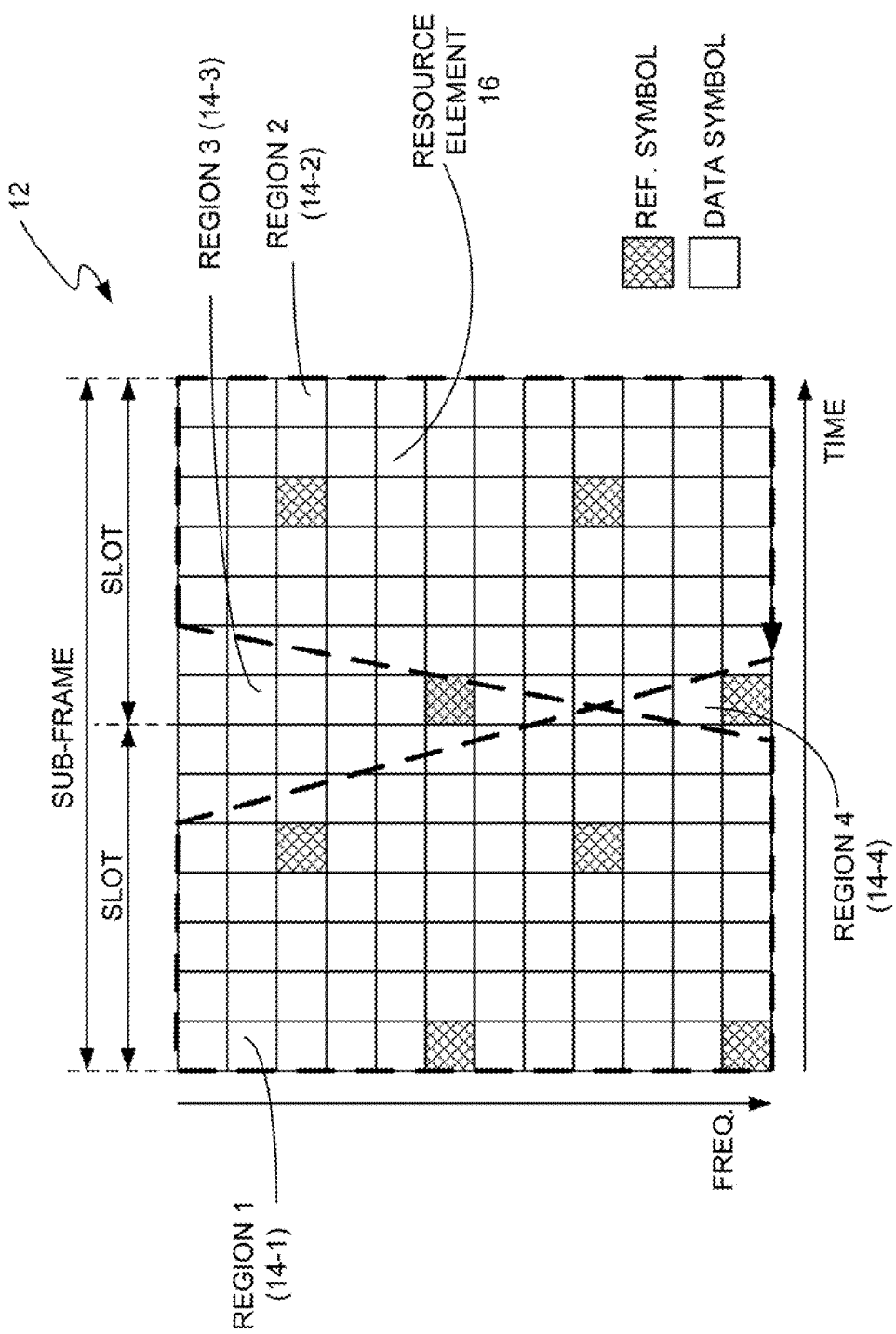
FIG. 2 is a diagram that extends the interference-region example of FIG. 1 to OFDM resource elements making up one or more given OFDM resource blocks.

FIG. 2 continues with the idea of differing interference patterns defining different regions 14 in the OFDM time-frequency grid 10, but it depicts a more detailed view of one resource block 12. That is, in FIG. 1, the grid 10 comprised resource blocks 12, but each such resource block 12 itself comprises a grid of "resource elements" 16. Each resource element 16 comprises a specific time-frequency resource, i.e., a particular OFDM sub-carrier frequency at a particular symbol time. Thus, one sees that a given OFDM resource block 12 comprises a grid of resource elements 16, with some resource elements 16 used to convey data symbols (unknown information), and some resource elements 16 used to convey reference symbols (known information, for use in channel estimation).

More specifically, FIG. 2 depicts one LTE sub-frame, for one pair of resource blocks 12, and one sees that the sub-frame is divided into two resource blocks located in adjacent slots. Further, the dashed lines depicted in FIG. 2 separate the grid into different interference regions (REGION 1-REGION 4, depicted by reference numerals 14-1 . . . 14-4). According to one or more aspects of the invention proposed herein, a wireless communication receiver provides a method and apparatus for interferer parameters estimation using multiple receiver arbitration. Multiple receiver arbitration lets the receiver determine which one (of two or more) receivers is the best choice for recovering each given symbol of interest within the time-frequency grid of a received OFDM signal.

Here, the term "receiver" connotes a particular arrangement of received signal processing elements—e.g., digital signal processing circuitry configured via hardware and/or software—that implements one or more particular received signal processing algorithms. As such, whether different processing circuits are used to implement each receiver, or whether some or all of the same circuits are re-used (with different programming instructions changing their operation), those skilled in the art will appreciate that a wireless communication receiver can be implemented with any number of received signal "receivers," each operating according to a different received signal processing algorithm.

Of particular interest herein, each "receiver" uses a different approach for demodulating symbols of interest from the time-frequency grid of a received OFDM signal. As a non-limiting example, one receiver may be configured to demodulate the received symbols without applying interference cancellation, while another receiver may be configured to generate impairment correlation estimates, derive combining weights/filter coefficients from such estimates, and use the weights/coefficients to suppress colored interference as part of the demodulation process.

Figure 3:
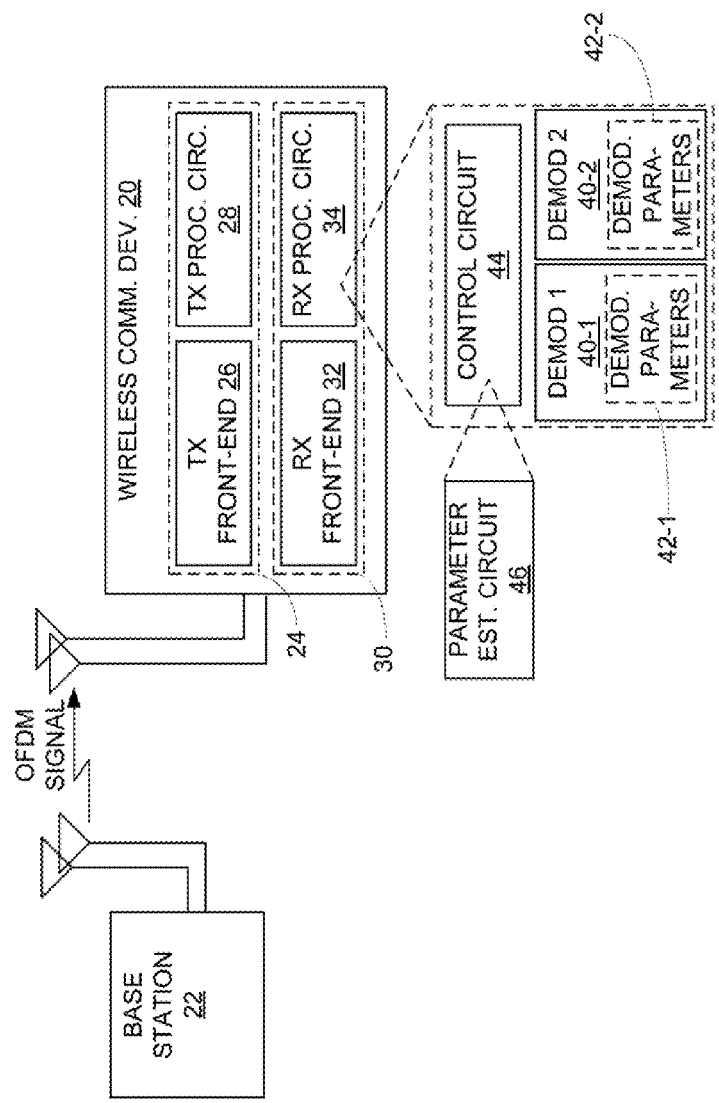
FIG. 3 is a block diagram illustrating one embodiment of a wireless communication device, such as a cellular radiotelephone, that includes a receiver configured according to the teachings presented herein.

FIG. 3 illustrates one embodiment of a wireless communication device 20 that receives an OFDM signal from a base station 22, or other transmitter. By way of non-limiting example, the base station 22 comprises an LTE base station, and the device 20 comprises an LTE handset—such as a mobile telephone, smart phone, PDA, pager, network access card (for a computer or laptop), or essentially any other type of wireless communication device. Of course, the receiver teachings detailed for the device 20 are not limited to LTE applications.

The device 20 includes a transmitter 24 having a transmit portion 26 (e.g., power amplifier) and associated transmit processing circuits 28. Further, the device 20 includes a receiver 30 having a receiver front-end 32 (e.g., amplifiers, filters, down-converters, analog-to-digital converters, gain control circuits, etc.) and associated receiver processing circuits 34. The transmitter and receiver processing circuits 28 and 34 may comprise separate or integrated baseband processing circuits, such as hardware and/or software-based digital signal processing circuitry, or other microprocessor-based circuitry.

Of particular interest herein, the receiver 30 is configured to demodulate a set of symbols dispersed within a time-frequency grid of a received Orthogonal Frequency Division Multiplexed (OFDM) signal. In the illustrated embodiment, the receiver 30 comprises two or more demodulators. Two demodulators are shown, depicted as 40-1 and 40-2. When generically referring to a given one of the demodulators, or referring to plural demodulators, the reference numeral "40" is used herein.

With that in mind, each demodulator 40 is configured to demodulate symbols from a received OFDM signal, and each one operates according to different demodulation parameters, each set of demodulation parameters corresponding to different interference assumptions. In the illustration, the demodulator 40-1 operates according to first demodulation parameters 42-1, and the demodulator 40-2 operates according to second demodulation parameters 42-2. When generally referring to given demodulation parameters, or referring to plural sets of demodulation parameters, the reference numeral "42" is used herein.

The receiver 30 further includes a control circuit 44 that is operatively associated with the two or more demodulators 40, and is configured to determine which one of the two or more demodulators 40 is preferred for use in a given region 14 of the time-frequency grid. The control circuit 44 makes this determination by evaluating detection statistics generated by the two or more demodulators 40 for the (received) set of symbols. As a further aspect of its configuration, the control circuit 44 is configured to recover the set of symbols for decoding using whichever demodulator 40 is preferred for each symbol (in the received OFDM signal), according to the region 14 from which the symbol is recovered.

In at least one embodiment, the control circuit 44 includes a parameter estimation circuit 46 that is configured to update the demodulation parameters 42 of each demodulator 40, according to reference and/or data signal measurements made for one or more regions in the time-frequency grid where the demodulator 40 is preferred, such that the two or more demodulators 40 operate with the updated demodulation parameters for said step of recovering. For example, in looking at the grid 12 depicted in FIG. 2, one sees that one or more reference symbols fall into each region 14. Assuming that the demodulator 40-1 was preferred for Region 1 (14-1), the reference symbols falling into Region 1 would be used to make measurements for updating the demodulation parameters 42-1, used by the demodulator 40-1. Thus, in one or more embodiments, measurements taken from reference symbols (e.g., pilot symbols) are used for parameter estimation, while in one or more other embodiments, data symbol and/or reference symbol measurements are used. Further, reference symbol measurements may be used to update the demodulation parameters 42-1 for one demodulator 40-1, while reference and/or data symbols are used to update the demodulation parameters 42-2 for another demodulator 40-2.

Further, those skilled in the art will appreciate that more than two demodulators 40 may be used by the receiver 30. These two or more demodulators 40 comprise at least a first demodulator, e.g., 40-1, configured as a non-interference-canceling demodulator and a second demodulator, e.g., 40-2, configured as an interference-canceling demodulator. Here, the control circuit 44 is configured to update the demodulation parameters, e.g., 42-2, of the second demodulator by updating impairment parameters used by the second demodulator for canceling interference. For example, the control circuit 44 is configured to update the demodulation parameters 42-1 of the first demodulator 40-1 by updating noise power estimates used by the first demodulator 40-1 for maximum ratio combining, and by updating impairment correlation estimates for the second demodulator 40-2 for interference cancellation. That is, the demodulation parameters 42-2 for the second demodulator 40-2 include or depend on impairment correlation estimates, such that updating the impairment correlation estimates resulting in updating the second demodulation parameters 42-2.

In at least one embodiment, the control circuit 44 is configured to carry out at least one cycle wherein it: demodulates a set of symbols from the received OFDM signal using each demodulator 40; uses the detection statistics resulting from that demodulation to identify one or more regions in the time-frequency grid where given ones of the demodulators 40 exhibit relatively better performance; and updates the set of demodulation parameters 42 of each demodulator 40 using reference signal information in the OFDM signal, as taken from the one or more regions identified for that demodulator. As such, the two or more demodulators 40 operate according to the updated demodulation parameters 42 for the step of recovering the set of symbols. In at least one such cycle, the demodulators 40 are configured to operate with an initialized set of demodulation parameters 42. Then, for each subsequent cycle, if any are performed, each demodulator 40 is configured to operate with an updated set of demodulation parameters 42, as updated in a prior cycle.

In the same or other embodiments, the control circuit 44 includes a selection circuit (not shown in FIG. 3) that is configured to track which demodulator 40 exhibited better demodulation performance for each symbol in the set of symbols and, wherein the control circuit 44 is configured to use time-frequency grid locations of the symbols in the set of symbols to discern regions in the time-frequency grid 10 where one demodulator 40 exhibits better demodulation performance. As such, the control circuit 40 is configured to recover the set of symbols by using the demodulator 40 that was determined as exhibiting better demodulation performance for a given region, for symbols in the set of symbols that fall into that given region.

Further, in one or more embodiments, the receiver 30 is configured to decode the recovered set of symbols to obtain decoded data, and at least for correctly decoded data, re-encode the decoded data to obtain re-encoded data, modulate the re-encoded data to obtain regenerated symbols corresponding to one or more symbols in the recovered set of symbols, and update the demodulation parameters 42 of one or more of the two or more demodulators 40, based on revising one or more interference parameter estimations according to the regenerated symbols. In at least one such embodiment, a subset of the data symbols is used for the re-encoding.

FIG. 4 illustrates a method contemplated herein, such as can be implemented with the receiver 30, via hardware and/or software configuration of the receiver 30. As a non-limiting example, the receiver 30 includes or has access to a memory or other computer-readable medium that stores computer program instructions that, when executed by the receiver processing circuits 34 of the receiver 30, implement the illustrated method or variations thereof.

According to the illustration, the method comprises demodulating a set of symbols dispersed within a time-frequency grid 10 of a received Orthogonal Frequency Division Multiplexed (OFDM) signal. In more detail, the method assumes that an OFDM signal has been received and buffered (Block 100), wherein the signal includes a set of symbols dispersed within a time-frequency grid 10 of the OFDM signal. With that, the method includes determining which one of two or more demodulators 40 is preferred for use in a given region 14 of the time-frequency grid 10 (Block 102). This determination is done by evaluating detection statistics generated by the two or more demodulators 40 (e.g., 40-1, 40-2) for the set of symbols, each said demodulator 40 operating according to different demodulation parameters 42 corresponding to different interference assumptions. The method further includes recovering the set of symbols for decoding using whichever demodulator 40 is preferred for each symbol according to the region from which the symbol is recovered (Block 104).

For example, referring back to FIG. 3 for a moment, the demodulator 40-1 may be preferred for some symbols, while the demodulator 40-2 may be preferred for other symbols. In a likely case, the demodulation parameters 42 used by a given one of the demodulators 40 will yield superior demodulation performance for one or more regions 14 in the time-frequency grid, such that the detection statistics from that given demodulator 40 will be preferred for those one or more regions. Similarly, one or more other demodulators 40 may offer (relatively) superior performance in other regions 14, and the detection statistics produced by those one or more other demodulators 40 will be used for those other regions 14.

FIG. 5 details one approach to such processing, wherein each demodulator 40 generates detection statistics—e.g., soft values indicating detected symbol values—for the set of received symbols (Block 110). Alternatively, the soft values may be representative of detected bit values, which comprise the set of received symbols. (Here, the "set" of received symbols are those symbols of interest, as taken from the time-frequency grid 10 of the received OFDM signal. The symbols of interest are at time-frequency resources determined, for example, based on the transmitter's user scheduling and allocation processing.) Processing further continues with evaluating the detection statistics, to determine which demodulator 40 is preferred for which region 14 of the time-frequency grid 10 (Block 112). That is, the detection statistic generated for each symbol by each demodulator 40 can be compared to same statistic generated by the other demodulators 40, to determine the "best" one. The best one may be, for example, the soft value having the greatest confidence weighting—closest in fractional value to a given one of the hard decision values of one or zero.

In at least one embodiment, the above processing includes the following steps: (1) hypothesizing different demodulator types to use for an initial detection of transmitted OFDM symbols in the time-frequency grid 10; (2) computing initial impairment parameter estimates for the different demodulators based on the assumptions regarding the interference profile for that demodulator; (3) computing first-pass desired symbol estimates for each demodulator; and, for each desired symbol position in the time-frequency grid, selecting a symbol estimate from one of the candidate first stage demodulators, as well as an indicator that identifies the demodulator that produced the detection statistic as the recovered symbol for the corresponding time-frequency grid position; feeding back the selected desired symbol estimates and the indicator values to an impairment parameter estimator that identifies regions in the time/frequency grid 10; (4) improving localized demodulation parameter estimates used by the demodulators in the first demodulation pass, based on the feedback; and (5) iterating the process.

Figure 6:
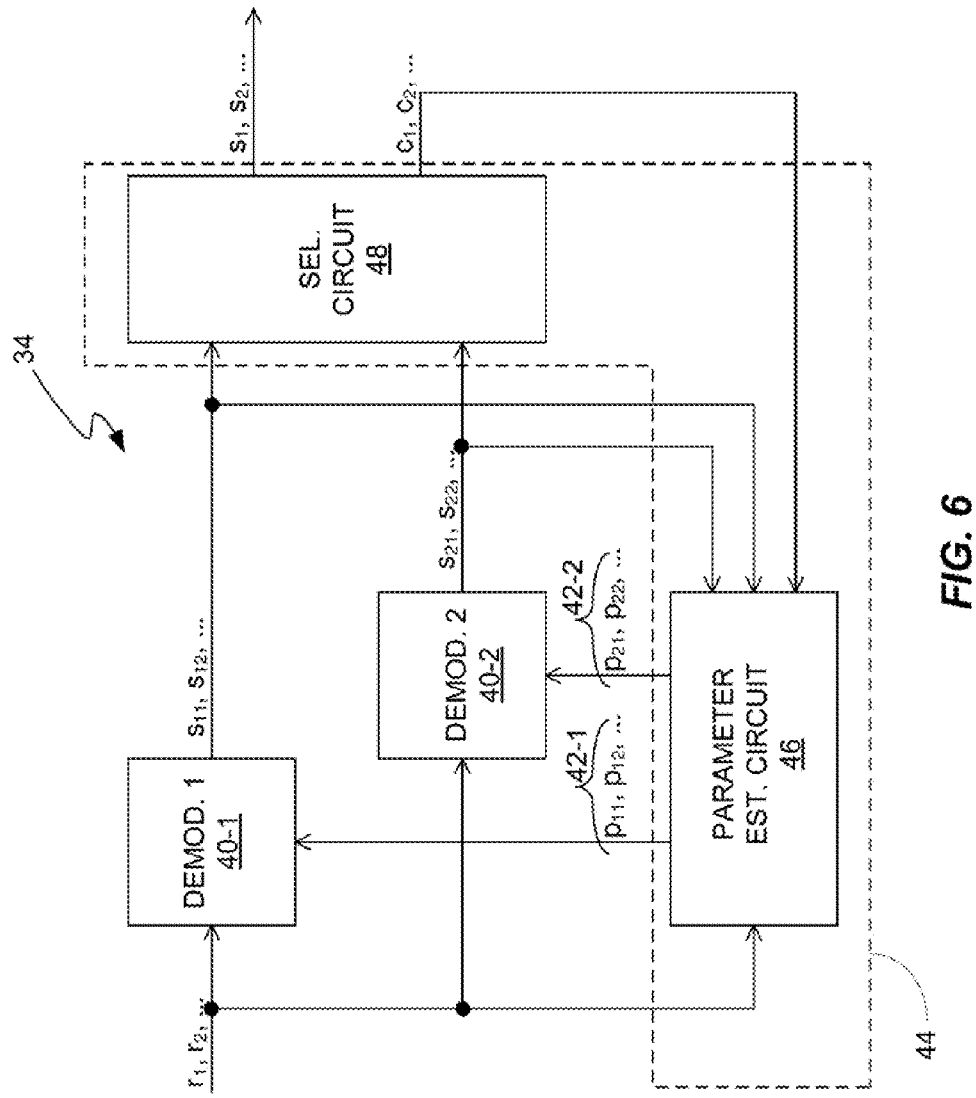
FIGS. 6-8 are block diagrams illustrating various embodiments of a receiver configured according to the teachings presented herein, such as may be used in the wireless communication device of FIG. 3, or elsewhere.

For a more detailed example of the above processing, FIG. 6 depicts one embodiment of the contemplated receiver processing circuits 34, including the control circuit 44, which is depicted as a parameter estimation circuit 46 and a selection circuit 48. One sees that received OFDM signal samples $r_1, r_2$, and so on, are provided to a first demodulator 40-1 and a second demodulator 40-2. Each demodulator 40 detects the symbols of interest from these received signal samples. Which particular symbols in the OFDM time-frequency grid that are of interest may be known to the receiver processing circuits 34, for example, from time-frequency resource assignment information signaled to the device 20.

The demodulator 40-1 thus produces detection statistics for symbols 1, 2, and so on, which are denoted as $s_{11}, s_{12}$, and so on. Likewise, the demodulator 40-2 produces detection statistics for the same symbols, and these are denoted as $s_{21}$, $s_{22}$, and so on. For each symbol of interest, the selection circuit 48 determines which demodulator 40 produced the best detection statistic. To do so, it may compare $s_{11}$ to $s_{21}$, $s_{12}$ to $s_{22}$, and so on. By taking the best detection statistic for each such comparison, the selection circuit 48 produces an output set of symbol detection statistics, denoted as $s_1, s_2$, and so on. These output symbols are referred to as recovered symbols, and they may be further processed, such as by decoding.

With the above approach, it is possible that $s_1$ comes from the demodulator 40-1, while $s_2$ comes from the demodulator 40-2, and that further such back-and-forth demodulator selections occur in recovered sets of symbols. However, it is more likely that the time-frequency grid exhibits localized patterns of interference, such that one of the demodulators 40 produces better detection statistics for all or most of the desired symbols that are recovered from time-frequency grid positions within or proximate to that localized pattern of interference.

As such, by examining which demodulator 40 produces the better symbol detection statistic for each symbol of interest, while simultaneously tracking the involved time-frequency grid position, the control circuit 44 recognizes the patterns of interference. That is, the control circuit 44 recognizes the different regions 14 in the time-frequency grid 10, based on recognizing which demodulator 40 does better at which time-frequency grid positions. In this regard, it will be understood that the interference assumption embodied in a given demodulator's demodulation parameters 42 are more valid in the time-frequency grid regions where that demodulator 40 performs better than the other demodulators 40.

To support such operation, the selection circuit 48 produces indicator selection information $c_1$, $c_2$, and so on, that identifies the demodulator 40 that produced the detection statistic selected as the recovered symbol for the corresponding time-frequency grid position. Further, the selection circuit 48 feeds that information back to the parameter estimation circuit 46. The detection statistics produced by the individual demodulators 40 are also fed back to the parameter estimation circuit 46, which uses the feedback to produce updated sets of demodulation parameters 42-1 and 42-2, for use by the demodulators 40-1 and 40-2, respectively. For example, in an initial demodulation run, the demodulator 40-1 demodulates all symbols of interest using an initialized set of demodulation parameters 42-1, and, likewise, the demodulator 40-2 demodulates all symbols of interest using an initialized set of demodulation parameters 42-2. Then, the process feeds back the resulting detection statistics from each demodulator 40, plus the corresponding indicator selection information about which detection statistic was selected for each symbol of interest The involved grid position may be signaled as part of the indicator selection information or known otherwise (e.g. based on the order of the fed back information). That feedback is used to update the demodulation statistics used by one or more of the demodulators 40.

For example, by recognizing that the demodulator 40-1 tended to produce better demodulation statistics for symbols within a given range of time-frequency grid positions, the parameter estimation circuit 46 can use channel estimates or measurements taken from reference (pilot) symbols that also fall in or proximate to the same range of time-frequency grid positions. In this manner, those reference symbols falling into the region(s) where a given demodulator 40 exhibits better performance are the ones used to update the demodulation parameters 42 for that given demodulator 40.

In a non-limiting example configuration, the demodulator 40-1 is configured to operate under the assumption there is no interference present—e.g., it is configured as a Maximum Ratio Combining (MRC) demodulator, where its demodulation parameters 42 are noise power estimates for a given set of reference pilot symbols in time-frequency grid positions. Further, the demodulator 40-2 is configured to operate under the assumption that there is colored interference in the symbols—e.g., it is configured to perform interference cancellation by Interference Rejection Combining (IRC) or joint detection suppression.

The output symbols—detection statistics—from each demodulator are passed to the selection circuit 48, which is configured to choose one of the detected symbols for each OFDM tile, and outputs each chosen symbol as a recovered symbol. An indicator of which symbol was selected is passed onto the impairment parameter estimation circuit 46. These indicator values and the symbols output from the demodulators are then used to re-estimate the demodulation parameters 42-1 for the demodulator 40-1, and to re-estimate the demodulation parameters 42-2 for the demodulator 40-2. For example, the initial demodulation parameter estimation can be performed using pilot symbols from one or more time-frequency grid positions—e.g., across all grid positions of interest—based on the corresponding demodulator's assumption of interference, and then revised once the first-pass demodulation run is performed, and given interference regions 14 are recognized.

Advantageously, this subsequent estimation of the demodulation parameters can include not only the pilot reference elements, but data elements from the OFDM time-frequency grid. The output symbols from the selection circuit 48 need not be passed back for impairment parameter estimation in the case where a simple selection operation is performed, as this information is available from the indicator selection $\{c_1, c_2, \ldots\}$ and the detection statistics as output by the demodulators 40-1 and 40-2.

Figure 7:
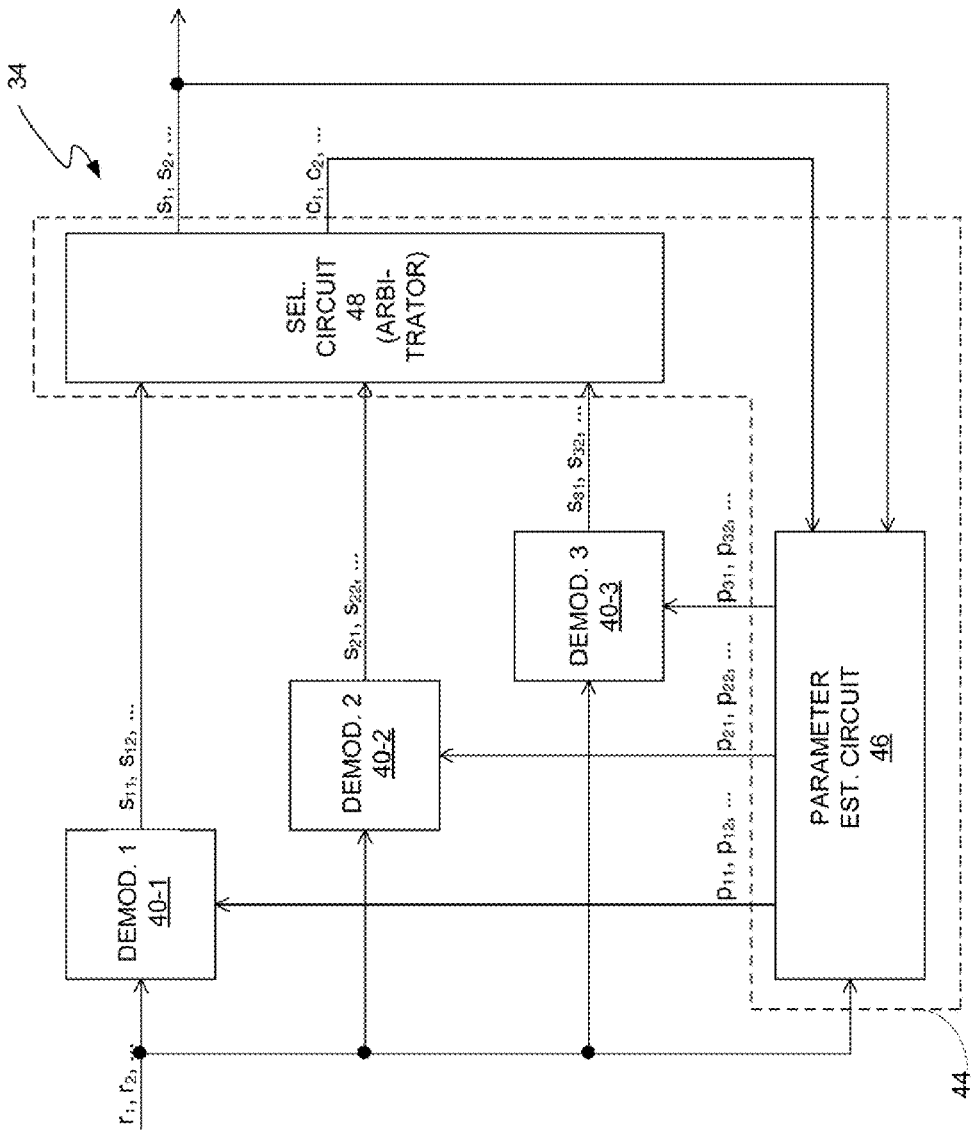

If a more complicated process is used instead of simple selection (e.g. the selection process uses arbitration), then the outputs $\{s1, s2, \ldots\}$ may be passed back in addition to, or in place of the first-pass demodulation outputs. FIG. 7 shows a similar approach to that above, but with three demodulators and the use of arbitration instead of simple selection. In this example, the assumption is that the demodulator 40-1 does not cancel interference, while the other two demodulators 40-2 and 40-3 are configured to perform interference cancellation. Additionally, with the selection circuit 48 configured to operate as an arbitrator, rather than a simple selector, the output of arbitration processing is fed back for demodulation parameter estimation instead of the actual detection statistics produced by the demodulators 40 during their first-pass of demodulating the desired symbols.

Also, as noted, the demodulators 40 in FIGS. 6 and 7 are shown as being separate, and this allows for different demodulator types to be easily implemented. However, if a given demodulator 40 can operate in multiple modes with only a change of parameters, then a single demodulator 40 can be run multiple times with different parameter sets, to obtain different sets of demodulation statistics for comparison.

Figure 8:
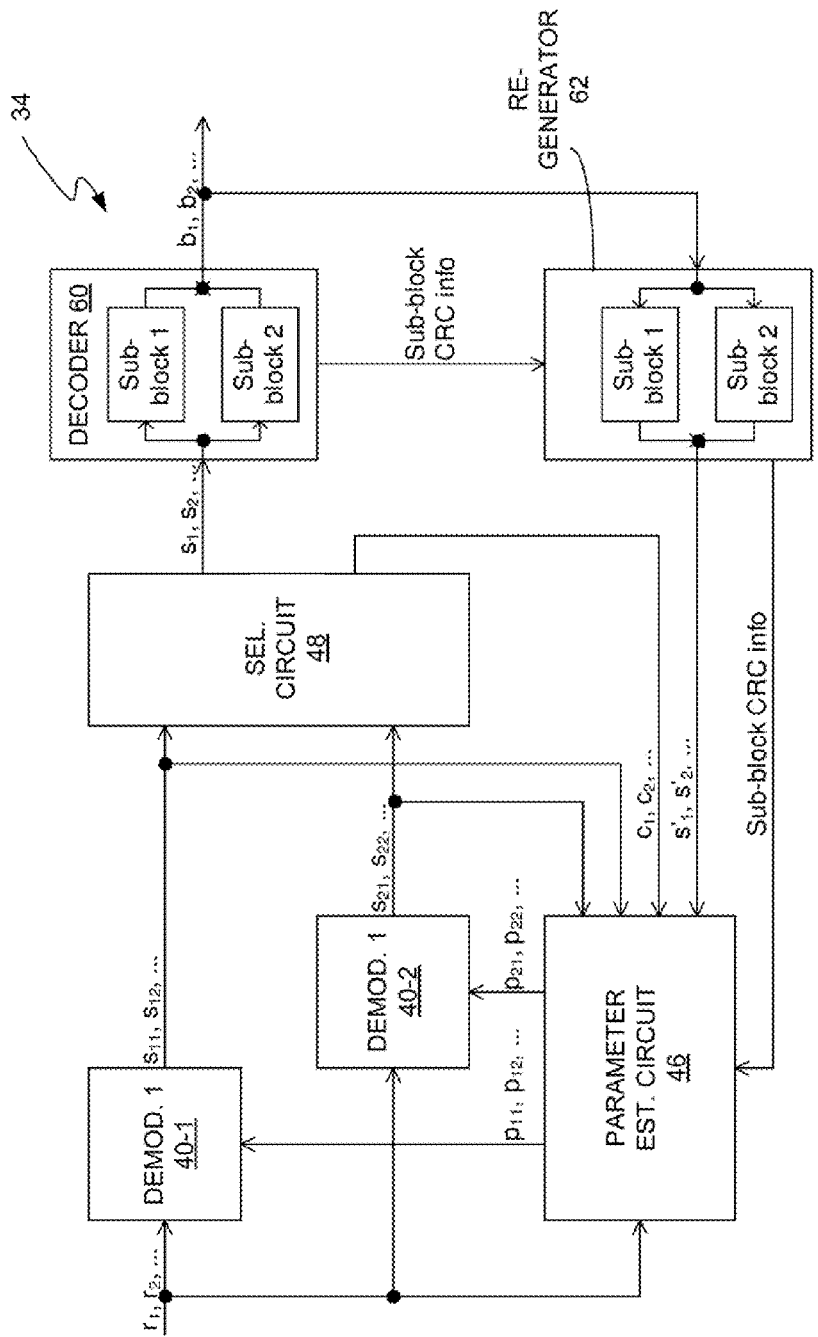

In a further variation, FIG. 8 depicts an embodiment of the receiver processing circuits 34 that use two demodulators 40-1 and 40-2, with the addition of outputting the selected symbols (recovered symbols) to a decoder 60 that contains multiple sub-block decoders (in this case two sub-block decoders). Each sub-block decoder outputs detected bits and a measure of the detection quality (such as a sub-block CRC check).

This is further used to improve the impairment parameter estimation by regenerating symbol information, at least for correctly recovered symbols. For example, the receiver 30 re-encodes the sub-blocks that pass the CRC check and re-modulates the symbols for the CRC passed sub-blocks. Such regeneration is done in a re-generator circuit 62 that may be included in the control circuit 44, or associated with the control circuit 44. The re-generated symbols are fed back to the demodulation parameter estimation circuit 46, together with the CRC information for the sub-blocks. The re-generated symbols can then be used for updating the demodulation parameters 42-1 and/or 42-2, such as by using the re-generated symbols to improve or otherwise update the impairment correlation estimates, and/or noise estimates, etc.

As before, the re-generated symbols from a given region of the time-frequency grid preferably are used to update the demodulation parameters 42 of the demodulator 40 that yielded the better performance in that given region. Further, for the sub-blocks that do not pass the CRC check, the originally detected symbols from the demodulators 40-1 and/or 40-2 may be used together with the indicator selection output from the selection block, to update the demodulation parameters 42-1 and/or 42-2. Again, for each given demodulator 40, updating the corresponding demodulation parameters 42 preferably is based on the symbol detection statistics taken from the grid region(s) where that given demodulator 40 performed better.

With the above approaches and variations in mind, the method and apparatus proposed herein offers advantageous operation in environments where the interference is not stationary. Two example advantages are the improvement of interferer parameter estimation by restricting the parameter estimation to occur in the localized regions, and the use of these improved interferer parameter estimates to improve detection performance (for data detection and also to assist in link adaptation).

Interference may be non-stationary (intermittent, time-varying, etc.) over multiple OFDM sub-frames, so estimating interference parameters over multiple sub-frames may not be effective. Using only reference pilots may not be effective either due to the sparseness of the reference symbols and their limited number. Consequently, using data symbols, as is provided for in the teachings presented herein, to help estimate interference parameters can improve performance as there are considerably more data symbols to help average out the effects of random noise.

As noted herein, pilot symbols may be used initially to determine the demodulation parameters 42, for each of two or more demodulators 40, but pilot and/or data symbols can be used thereafter to update the demodulation parameters 42. For example, one demodulator 40-1 is set up such that it does not perform interference cancellation, and one demodulator 40-2 is set up such that it does perform interference cancellation. In this regard, the demodulation parameters 42-1 used by the demodulator 40-1 do not depend on interferer parameter estimates, such as impairment correlation estimates. In contrast, the demodulation parameters 42-2 used by the demodulator 40-2 do depend on interferer parameter estimates, such as impairment correlation estimates. As one example, the receiver 30 forms impairment correlation estimates as a covariance matrix that includes diagonal elements expressing the variance of noise and interference at each of the configured receive antennas. Off-diagonal elements reflect the cross-correlation of noise and interference between those receive antennas.

In any case, with the non-IC and IC arrangement described above, the demodulation parameters 42-1 and 42-2 can be initialized using reference symbol measurements taken across the time-frequency grid, at least for that portion of the grid that includes a received set of desired symbols. Then, each demodulator 40-1 and 40-2 can be used to demodulate each symbol of interest, with each demodulator 40 operating according to its initialized set of demodulation parameters 42. By comparing which demodulator 40-1 or 40-2 produced the better demodulation statistic for each desired symbol, the receiver 30 identifies one or more regions in the time-frequency grid where one demodulator or the other performs better.

With that knowledge, the receiver 30 uses reference and/or data symbols from those one or more regions to update the demodulation parameters 42 used by that demodulator. In other words, only symbols from the region(s) 14 where a given demodulator 40 exhibits good performance (relative to the other demodulators 40), are used to update the demodulation parameters 42 used by that given demodulator 40. This operation is referred to as "localized" updating of demodulation parameters. And, in the example where the demodulator 40-1 is a non-IC demodulator, data and/or reference symbols from the region(s) 14 where it outperforms the IC demodulator 40-2 are used to update, e.g., noise power estimates used by the demodulator 40-1 for MRC processing of the received symbols.

For example, the demodulator 40-1 may use an AWGN assumption, and operate as a conventional MRC receiver, wherein it combines received data symbols according to combining weights that reflect channel attenuation and phase estimates. These combining weights can be initially formed using noise power estimates and channel estimates obtained from reference pilot symbols within the time-frequency grid, and subsequently estimated from pilot and/or data symbols within specific regions 14 of the time-frequency grid 10 where the demodulator 40-1 outperformed the demodulator 40-2. Note that not all reference pilots may be used, as the channel may vary over frequency, due to dispersion.

Similarly, data and/or reference symbols from the region(s) 14 where the IC demodulator 40-2 outperforms the non-IC demodulator 40-1 can be used to update the demodulation parameters 42-2 used by the demodulator 40-2. Here, in an example IC configuration, the demodulator 40-2 operates as an IRC receiver that combines received data symbols according to combining weights that incorporate estimated impairment correlations—i.e., the correlation of interference observed between the receive antennas.

Thus, the demodulation parameters 42-2 may initially be based on measurements taken from available reference symbols within the time-frequency grid (or based on assumed interference models), and then refined using only those data and/or pilot symbols in the grid region(s) 14 where the demodulator 40-2 exhibited better performance. For example, the receiver 30 may maintain impairment correlation estimates in the form of an impairment covariance matrix, and combining weights may be derived from channel estimates and the impairment covariance matrix, for use as the demodulation parameters 42-2 associated with the demodulator 40-2. The demodulation parameters 42-2 may be initially based on reference symbol measurements, and then subsequently updated.

Accordingly, the teachings herein improve data detection by using a receiver that better matches its demodulation to the localized interference patterns that are manifested across or within an OFDM time-frequency grid 10. Using an approach consisting of multiple demodulators 40 helps improve detection performance by hypothesizing interference under varying assumptions and choosing the most reliable detection outcome. Moreover, this approach allows the receiver to discern different regions 14 in the time-frequency grid 10, corresponding to different interference conditions, and then use a "localized" updating process for its demodulators 40. Since the two problems of parameter estimation and data detection rely upon each other, iteration is used as a means to improve performance.

Of course, those skilled in the art will appreciate that the present invention is not limited by the foregoing discussion and accompanying drawings. Instead, the present invention is limited only by the claims and their legal equivalents.

What is claimed is:

1. A method in a receiver of demodulating a set of symbols dispersed within a time-frequency grid of a received Orthogonal Frequency Division Multiplexed (OFDM) signal, the method comprising:
    determining which one of two or more demodulators is preferred for use in a given region of the time-frequency grid by evaluating detection statistics generated by the two or more demodulators for the set of symbols, each said demodulator operating according to different demodulation parameters corresponding to different interference assumptions; and
    recovering the set of symbols for decoding using whichever demodulator is preferred for each symbol, according to the region from which the symbol is recovered.

2. The method of claim 1, further comprising updating the demodulation parameters of each demodulator according to reference or data signal measurements made for one or more regions in the time-frequency grid where the demodulator is preferred, such that the two or more demodulators operate with the updated demodulation parameters for said step of recovering.

3. The method of claim 2, wherein the two or more demodulators comprise at least first and second demodulators, and further comprising configuring the first demodulator as a non-interference-canceling demodulator and configuring the second demodulator as an interference-canceling demodulator, and wherein said step of updating the demodulation parameters comprises, for the second demodulator, updating impairment parameters used by the second demodulator for canceling interference.

4. The method of claim 2, wherein said step of updating comprises updating noise power estimates for a first one of the two or more demodulators, and updating impairment correlation estimates for a second one of the two or more demodulators, wherein the first demodulator comprises a non-interference-canceling demodulator and the second demodulator comprises an interference-canceling demodulator.

5. The method of claim 2, wherein said step of updating the demodulation parameters comprises, for at least one of the demodulators, updating the demodulation parameters according to reference symbols and data symbols of the received OFDM signal within the one or more regions in the time-frequency grid where the demodulator is preferred.

6. The method of claim 1, wherein said step of determining comprises at least one cycle of demodulating the set of symbols using each demodulator, using the detection statistics resulting from said demodulation to identify one or more regions in the time-frequency grid where given ones of the demodulators exhibit relatively better performance, and updating the set of demodulation parameters of each demodulator using reference or data signal information in the OFDM signal, as taken from the one or more regions identified for that demodulator, such that said two or more demodulators operate according to the updated demodulation parameters for said step of recovering the set of symbols.

7. The method of claim 6, wherein, for a first one of said one or more cycles, each demodulator operates with an initialized set of demodulation parameters, for each subsequent cycle, if any are performed, each demodulator operates with an updated set of demodulation parameters, as updated in a prior cycle.

8. The method of claim 1, wherein said step of determining comprises tracking which demodulator exhibited better demodulation performance for each symbol in the set of symbols, and using time-frequency grid locations of the symbols in the set of symbols to discern regions in the time-frequency grid where one demodulator exhibits better demodulation performance.

9. The method of claim 8, wherein said step of recovering comprises recovering symbols within the set of symbols that fall within a given region using the demodulator that was determined as exhibiting better demodulation performance for that given region.

10. The method of claim 1, further decoding the recovered set of symbols to obtain decoded data, and, at least for correctly decoded data, re-encoding the decoded data to obtain re-encoded data, modulating the re-encoded data to obtain regenerated symbols corresponding to one or more symbols in the recovered set of symbols, and updating the demodulation parameters of one or more of the two or more demodulators based on revising one or more interference parameter estimations according to the regenerated symbols.

11. The method of claim 10, wherein said step of re-encoding comprises using a subset of the decoded data to obtain the re-encoded data symbols.

12. A receiver for demodulating a set of symbols dispersed within a time-frequency grid of a received Orthogonal Frequency Division Multiplexed (OFDM) signal, the receiver comprising:
two or more demodulators, each configured to demodulate symbols from the received OFDM signal, each said demodulator operating according to different demodulation parameters corresponding to different interference assumptions; and
a control circuit operatively associated with the two or more demodulators and configured to determine which one of the two or more demodulators is preferred for use in a given region of the time-frequency grid by evaluating detection statistics generated by the two or more demodulators for the set of symbols, and to recover the set of symbols for decoding using whichever demodulator is preferred for each symbol according to the region from which the symbol is recovered.

13. The receiver of claim 12, wherein the control circuit includes a parameter estimation circuit that is configured to update the demodulation parameters of each demodulator according to reference or data signal measurements made for one or more regions in the time-frequency where the demodulator is preferred, such that the two or more demodulators operate with the updated demodulation parameters for said step of recovering.

14. The receiver of claim 13, wherein the two or more demodulators comprise at least a first demodulator configured as a non-interference-canceling demodulator and a second demodulator configured as an interference-canceling demodulator, and wherein the control circuit is configured to update the demodulation parameters of the second demodulator by updating impairment parameters used by the second demodulator for canceling interference.

15. The receiver of claim 13, wherein the control circuit is configured to update the demodulation parameters for at least one of the demodulators according to reference symbols and data symbols of the received OFDM signal within the one or more regions in the time-frequency grid where the demodulator is preferred.

16. The receiver of claim 13, wherein the control circuit is configured to update the demodulation parameters of the first demodulator by updating noise power estimates used by the first demodulator for maximum ratio combining, and by updating impairment correlation estimates for the second demodulator for interference cancellation.

17. The receiver of claim 12, wherein the control circuit is configured to carry out at least one cycle wherein it:
demodulates the set of symbols using each demodulator;
uses the detection statistics resulting from said demodulation to identify one or more regions in the time-frequency grid where given ones of the demodulators exhibit relatively better performance; and
updates the set of demodulation parameters of each demodulator using reference or data signal information in the OFDM signal, as taken from the one or more regions identified for that demodulator, such that said two or more demodulators operate according to the updated demodulation parameters for said step of recovering the set of symbols.

18. The receiver of claim 17, wherein, for a first one of said at least one cycle, the demodulators are configured to operate with an initialized set of demodulation parameters, and for each subsequent cycle, if any are performed, each demodulator is configured to operate with an updated set of demodulation parameters, as updated in a prior cycle.

19. The receiver of claim 12, wherein said control circuit includes a selection circuit that is configured to track which demodulator exhibited better demodulation performance for each symbol in the set of symbols and, wherein the control circuit is configured to use time-frequency grid locations of the symbols in the set of symbols to discern regions in the time-frequency grid where one demodulator exhibits better demodulation performance.

20. The receiver of claim 19, wherein said control circuit is configured to recover the set of symbols by using the demodulator that was determined as exhibiting better demodulation performance for a given region, for symbols in the set of symbols that fall into that given region.

21. The receiver of claim 12, wherein the receiver is configured to decode the recovered set of symbols to obtain decoded data, and, at least for correctly decoded data, re-encode the decoded data to obtain re-encoded data, modulate the re-encoded data to obtain regenerated symbols corresponding to one or more symbols in the recovered set of symbols, and update the demodulation parameters of one or more of the two or more demodulators based on revising one or more interference parameter estimations according to the regenerated symbols.

22. The receiver of claim 21, wherein the receiver is configured to re-encode a subset of the decoded data to obtain the re-encoded data symbols.

23. A method in a receiver of demodulating a set of symbols dispersed within a time-frequency grid of a received OFDM signal, the method comprising:
performing at least one cycle of:
demodulating the set of symbols with each of two or more demodulators, wherein each demodulator is configured according to a different interference assumption;
comparing demodulation performance of the two or more demodulators on a per symbol basis for at least some of the symbols in the set of symbols, to thereby identify which demodulator exhibits relatively better demodulation performance at grid locations in the time-frequency grid corresponding to the at least some of the symbols;
updating each demodulator's demodulation parameters using reference or data signal measurements taken from the received OFDM signal at or proximate to those grid locations where the demodulator exhibited relatively better demodulation performance; and
recovering the set of symbols for decoding by the receiver using, for each symbol in the set of symbols, whichever demodulator exhibited relatively better performance at or proximate to the grid location of that symbol, wherein said two or more demodulators operate with their updated demodulation parameters for said step of recovering.

* * * * *

UNITED STATES PATENT AND TRADEMARK OFFICE
CERTIFICATE OF CORRECTION

Page 1 of 1

PATENT NO.       : 8,064,531 B2
APPLICATION NO.  : 12/612208
DATED            : November 22, 2011
INVENTOR(S)      : Molnar It is certified that error appears in the above-identified patent and that said Letters Patent is hereby corrected as shown below:

In the claims,

In Column 15, Line 51, in Claim 16, delete "claim 13," and insert -- claim 14, --, therefor.

Signed and Sealed this
Ninth Day of February, 2016

Michelle K. Lee
*Director of the United States Patent and Trademark Office*